United States Patent Office 2,882,325
Patented Apr. 14, 1959

2,882,325

ALKYLATION OF AROMATIC COMPOUNDS

John P. Luvisi, Park Ridge, and Louis Schmerling, Riverside, Ill., assignors to Universal Oil Products Company, Des Plaines, Ill., a corporation of Delaware No Drawing. Application December 26, 1957
Serial No. 705,108

17 Claims. (Cl. 260—671)

This invention relates to a process for the nuclear alkylation of aromatic compounds and more particularly to a novel method of treating the aromatic compound before said compound undergoes alkylation.

It is an object of this invention to prepare nuclearly substituted alkylated aromatic compounds by condensing an aromatic compound with an alkylating agent after pretreating said aromatic compound.

A further object of this invention is to prepare nuclearly substituted aromatic compounds by condensing an alkylatable aromatic compound with an alkylating agent after pretreating said aromatic compound by contact with a metal halide and a metal oxide.

One embodiment of this invention is found in a process for the nuclear alkylation of an alkylatable aromatic compound containing a replaceable hydrogen atom by treating said alkylatable aromatic compound with a mixture of a metal halide and an oxide of a metal selected from the group consisting of groups VB and VIB of the periodic table, thereafter reacting the resulting mixture with an alkylating agent at alkylating conditions, and recovering the resultant alkylated aromatic compound.

A further embodiment of the invention is found in a process for the nuclear alkylation of an alkylatable aromatic hydrocarbon containing a replaceable hydrogen atom which comprises treating an alkylatable aromatic hydrocarbon with a mixture of aluminum chloride and vanadium pentoxide, thereafter reacting the resultant mixture with an alkylating agent at alkylating conditions, and recovering the resultant alkylated aromatic hydrocarbon.

A specific embodiment of the invention is found in a process for the nuclear alkylation of benzene which comprises treating benzene with a mixture of aluminum chloride and vanadium pentoxide, thereafter reacting the resultant mixture with an alkylating agent at alkylating conditions, and recovering the resultant alkylated benzene.

A more specific embodiment of the invention is found in a process for the nuclear alkylation of benzene which comprises treating said benzene with a mixture of aluminum chloride and vanadium pentoxide, thereafter reacting the resultant mixture with t-butyl chloride at a temperature in the range of from about 20° to about 100° C., and recovering the resultant t-butyl benzene.

Other objects and embodiments of the invention referring to alternative aromatic compounds, alkylating agents and alkylation catalysts will be found in the following further detailed description of the invention.

It has now been discovered that improved yields of nuclearly substituted aromatic compounds which may be used as intermediates in the preparation of detergents (for example, by sulfonation of a long chain alkyl aromatic compound), pharmaceuticals, resins, fine chemicals, etc., may be prepared by treating an alkylatable aromatic compound with a metal halide and a metal oxide, and thereafter condensing the resultant mixture with an alkylating agent.

Metal halides of the Friedel-Crafts type are relatively insoluble in certain aromatic compounds, for example, aluminum chloride is relatively insoluble in benzene. It has now been discovered that when Friedel-Crafts metal halide catalysts are treated with an aromatic compound in the presence of certain metal oxides both the metal oxide and the Friedel-Crafts catalyst are dissolved in the aromatic compound. This solubilization of the catalyst will result in an increased yield of the desired alkylated aromatic hydrocarbon. The pretreatment of the aromatic compound to be alkylated will take place at temperatures ranging from atmospheric to about 100° C. or more. When atmospheric temperatures are used for the pretreatment the reaction will take place at atmospheric pressure. However, if higher temperatures are employed to speed the reaction, correspondingly higher pressures, that is pressures in the range of from about 2 atmospheres to about 100 atmospheres or more will also be employed, the pressure used being sufficient to maintain a portion of the aromatic compound in the liquid phase.

The condensation or alkylation reaction will take place at temperatures ranging from about 20° to about 150° C. or more and at pressures ranging from atmospheric to about 100 atmospheres or more, the temperature and pressure depending upon the particular reactants selected to undergo condensation, as well as the particular catalyst employed. For example, when tertiary alkyl halides are used as alkylating agents the reaction temperature will usually be lower than when secondary alkyl halides are used. Likewise the use of secondary alkyl halides as alkylating agents will usually allow the use of a lower temperature range than will be required when a primary alkyl halide is used.

Aromatic compounds which may be nuclearly alkylated by the aforementioned alkylating agents in the process of this invention are those which contain a replaceable hydrogen atom and include benzene, toluene, o-, m- and p-xylene, 1,2,3-trimethylbenzene, etc., ethylbenzene propylbenzenes, butylbenzenes, etc.; 1,2-diethylbenzene, 1,2,3-triethylbenzene, 1,2-dipropylbenzene, 1,3-dipropylbenzene, 1,2,3-tripropylbenzene, etc.; naphthalene, 1-methylnaphthalene, 2-methylnaphthalene, 1-ethylnaphthalene, 2-ethylnaphthalene, 1-propylnaphthalene, 2-propylnaphthalene, etc.; 1,4-dimethylnaphthalene, 1,2-diethylnaphthalene, 1,5-dipropylnaphthalene, etc.; 1,2,3-trimethylnaphthalene, 1,2,4-trimethylnaphthalene, 1,2,3-triethylnaphthalene, etc.; 1,2,3,4-tetrahydronaphthalene; indene; indan, etc.; anthracene, 2-methylanthracene, 1-methylanthracene, 1-ethylanthracene, 2-ethylanthracene, 9,10-dimethylanthracene, 1,2-diethylanthracene, etc.; 9,10-dipropylanthracene, etc.; phenanthrene, 1-methylphenanthrene, 2-methylphenanthrene, etc.; 1-ethylphenanthrene, 2-ethylphenanthrene, etc.; 1,2-dimethylphenanthrene, 1,3-dimethylphenanthrene, 1,2-diethylphenanthrene, etc.; chrysene, 1-methylchrysene, 2-methylchrysene, 1,2-dimethylchrysene, 1,3-diethylchrysene, etc.; pyrene, 1-methylpyrene, 2-methylpyrene, etc.; 1-ethylpyrene, 2-ethylpyrene, etc.; 1,2-dimethylpyrene, etc. In general, the process of this invention is particularly useful with normally liquid aromatic hydrocarbons or those which are liquid under the reaction conditions. It is understood that the above mentioned aromatic compounds are set forth only as examples of the compounds which may be used in this process and that any aromatic compounds which will undergo alkylation in a condensation reaction with an alkylating agent may be used in the process of the present invention. This will include substituted aromatic compounds other than those enumerated above such as the phenols and halogen-substituted benzenes such as chlorobenzene, bromobenzene, dichlorobenzene, dibromobenzene, etc., and the like.

Suitable alkylating agents include primary, secondary and tertiary alkyl halides, polyhaloalkanes, halocycloalkanes, aralkyl halides, etc., the preferred halogen atoms being chlorine and bromine. Examples of alkylating agents which may be used include alkyl halides such as methyl chloride, ethyl chloride, propyl chloride, n-butyl chloride, sec-butyl chloride, isobutyl chloride, t-butyl chloride, etc., methyl bromide, ethyl bromide, propyl bromide, n-butyl bromide, sec-butyl bromide, isobutyl bromide, t-butyl bromide, etc.; polyhaloalkanes such as carbon tetrachloride, bromotrichloromethane, chloroform, 1,1-dichloromethane, 1,1-dichloroethane, 1,1-dibromoethane, 1,1,2-trichloroethane, 1,1,2-tribromoethane, 1,1-dichloropropane, 1,2-dichloropropane, 1,1-dibromopropane, 1,2-dibromopropane, 1,1,2-trichloropropane, 1,1,2-tribromopropane, 1,1,3,3-tetrachloropropane, 1,1,3,3-tetrabromopropane, 1,1-dichlorobutane, 1,2-dichlorobutane, 2,2-dichlorobutane, 2,3-dichlorobutane, 1,1-dibromobutane, 1,2-dibromobutane, 2,3-dibromobutane, 1,1,2-trichlorobutane, 1,1,3-tribromobutane, 1,2-dichloro-2-methylpropane, 1,2-dibromo-2-methylpropane, 1,3-dichloro-3-methylbutane, 1,3-dibromo-3-methylbutane, poly-chlorinated and polybrominated pentanes, hexanes, etc.; halocycloalkanes such as chlorocyclopentane, bromocyclopentane, chlorocyclohexane, bromocyclohexane, chlorocycloheptane, bromocycloheptane, 1,2-dichlorocyclopentane, 1,2-dibromocyclopentane, 1,2-dichlorocyclohexane, 1,2-dibromocyclohexane, 1,3-dichlorocyclopentane, 1,3-dibromocyclopentane, 1,2-dichlorocyclohexane, 1,3-dibromocyclohexane, etc.; aralkyl halides such as benzyl chloride, benzyl bromide, 1-chloroethylbenzene, 1-bromoethylbenzene, 1,1-dichloroethylbenzene, 1,1-dibromoethylbenzene, etc. In addition, polyhaloalkanes, characterized by containing a quaternary carbon atom, such as those which may be obtained, for example, by the reaction of a saturated tertiary halide (i. e. a tertiary alkyl or cycloalkyl halide such as t-butyl chloride, or 1-methyl-1-chlorocyclohexane) with a vinyl halide may also be used in this invention. These polyhaloalkanes include 1,1-dichloro-3,3-dimethylbutane, 1,1 - dibromo - 3,3 - dimethylbutane, 1,1 - dichloro - 3,3-dimethylpentane, 1,1-dibromo-3,3-dimethylpentane, 1,1,2-trichloro-3,3-dimethylbutane, 1,1,2-tribromo-3,3-dimethylbutane, 1,1 - dichloro - 3 - methyl - 3 - ethylpentane, 1,1-dibromo - 3 - methyl-3-ethylpentane, 1,1,2-trichloro-3,3-dimethylpentane, 1,1,2 - tribromo - 3,3 - dimethylpentane, 1,1 - dichloro - 3,3 - diethylpentane, 1,1 - dibromo-3,3-diethylpentane, 1,1,2-trichloro-3,3-diethylpentane, 1,1,2-tribromo-3,3-diethylpentane, 1,1-dichloro-3,3-dimethylhexane, 1,1-dibromo-3,3-dimethylhexane, 1,1,2-trichloro-3,3-dimethylhexane, 1,1,2-tribromo-3,3-dimethylhexane, 1,1-dichloro-3,3-diethylhexane, 1,1-dibromo-3,3-diethylhexane, 1,1,2-trichloro-3,3-diethylhexane, 1,1,2-tribromo-3,3-diethylhexane, 1,1-dichloro-4,4-dimethylpentane, 1,2-dichloro-4,4-dimethylpentane, 1,2,3-trichloro-4,4-dimethylpentane, 1,1-dibromo-4,4-dimethylpentane, 1,2-dibromo-4,4-dimethylpentane, 1,1-dichloro - 4 - methyl-4-ethylpentane, 1,1-dibromo-4-methyl-4-ethylpentane, 1,1-dichloro-4,4-dimethylhexane, 1,1-dichloro-5,5-dimethylhexane, 1,1-dibromo-4,4-dimethylhexane, 1,2-dibromo-3,3-dimethylhexane, 1,2-dichloro-3,3-dimethylhexane, etc. For purposes of this specification and claims these mono- and polyhalogenated hydrocarbons will be referred to as halogenated alkylating agents.

In addition to the aforementioned mono- and polyhalogenated hydrocarbons, olefins such as ethylene, propylene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, the nonenes, decenes, undecenes, dodecenes, etc.; branched olefins such as 2-methyl-1-butene, 2-methyl-2-butene, 2-methyl-1-pentene, 2-methyl-2-pentene, 2-methyl-3-pentene, 2-methyl-1-hexene, 2-methyl-2-hexene, 2-methyl-3-hexene, 2-methyl-1-heptene, 2-methyl-2-heptene, 2-methyl-3-heptene, 2-methyl-1-octene, 2-methyl-2-octene, 2-methyl-3-octene, 2-methyl-4-octene, etc., the branched chain decenes, undecenes, dodecenes, etc., and cycloolefins such as cyclopentene and its homologs and cyclohexene and its homologs, etc., may also be used as alkylating agents. It is also contemplated within the scope of this invention that the aromatic compounds hereinbefore set forth, after being treated with the metal halide and metal oxide, may also undergo acylation when treated with acyl halides such as acetyl chloride, acetyl bromide, propionyl chloride, propionyl bromide, n-butyryl chloride, isobutyryl chloride, n-butyryl bromide, isobutyryl bromide, n-valeryl chloride, isovaleryl chloride, n-valeryl bromide, isovaleryl bromide, n-caproyl chloride, isocaproyl chloride, n-caproyl bromide, isocaproyl bromide, n-heptanoyl chloride, isoheptanoyl chloride, n-heptanoyl bromide, isoheptanoyl bromide, etc.

Metal halides which may comprise one of the reactants in the process of this invention include Friedel-Crafts type catalysts such as aluminum chloride, aluminum bromide, ferric chloride, zinc chloride, zirconium chloride, boron trifluoride, etc. Although technically speaking boron is not a metal but rather a metalloid, for purposes of this invention the term "metal" will apply to boron as well as the other metals of the class of Friedel-Crafts type catalysts. Aluminum chloride is the preferred metal halide. Metal oxides which may be used in this invention include the oxides of the metals of groups V and VI of the periodic table such as vanadium dioxide, vanadium trioxide, vanadium tetraoxide, vanadium pentaoxide, niobium monooxide, niobium pentaoxide, tantalum dioxide, tantalum tetraoxide, tantalum pentaoxide, tungsten dioxide, tungsten trioxide, tungstic acid, molybdenum dioxide, molybdenum sesquioxide, chromic oxide, chromium dioxide, chromuim sesquioxide, chromous dioxide, etc.

The process of this invention may be effected in any suitable manner and may comprise either a batch or a continuous type operation. When a batch type operation is used a quantity of the aromatic compound, the metal halide and the metal oxide are placed in an appropriate apparatus and thoroughly admixed at the desired temperature and pressure for a predetermined residence time. At the end of this time the resulting solution is filtered and the treated aromatic hydrocarbon is recovered. This pretreated alkylatable aromatic hydrocarbon and alkylating agent are then placed in a second apparatus or, if so desired, returned to the first apparatus and reacted at alkylating conditions, that is conditions depending upon the particular alkylating agent and aromatic hydrocarbon used. At the end of the predetermined residence time the apparatus and contents thereof are allowed to cool to room temperature. The desired product is separated from the unreacted starting materials and/or undesired side reaction by conventional means, for example, by washing, drying and fractional distillation.

Another method by which the process of this invention may be effected is a continuous type operation. In this type of operation the aromatic compound is continuously charged to a reaction zone which is maintained at the proper operating conditions of temperature and pressure. The metal halide and metal oxide are also continuously charged to this reaction zone either through separate means or, if so desired, they may be admixed prior to entry into said reaction zone and charged thereto in a single line. After a predetermined residence time has been met the pretreated aromatic hydrocarbon is continuously withdrawn from the reaction zone, separated from the reactor effluent by filtration, after which the aromaitc compound is continuously charged to a second reaction zone also maintained at the proper operating conditions of temperature and pressure. The particular alkylating agent which is being used is also continuously charged to the second reactor through a separate line. After a predetermined residence time has been met in the second reaction zone the alkylated aromatic hydrocarbon is continuously withdrawn, separated from the reactor effluent, purified by conventional means hereinbefore set forth and recovered, while the effluent may be separated and recycled to form a portion of the feed stock. It is to be noted that both reaction zones which are used in this continuous type operation may comprise an unpacked vessel or coil or, if so desired, may be lined with an adsorbent packing material such as fire brick, dehydrated bauxite, alumina and the like.

In the above descriptions of the process of this invention in either batch or continuous type operation, pretreated aromatic compound was filtered from undissolved metal halide and metal oxide before being contacted with the alkylating agent. An alternate operation includes the direct treatment of the mixture of pretreated aromatic compound and undissolved metal halide and metal oxide with the alkylating agent. In many cases, this will lead to beneficial results, both the dissolved catalyst and the undissolved catalyst catalyzing the desired alkylation.

The following examples are given to illustrate the process of the present invention, which, however, are not intended to limit the generally broad scope of the present invention in strict accordance therewith.

*Example I*

A mixture of 10 g. of vanadium pentoxide, 5.4 g. of aluminum chloride and 101 g. of benzene was placed in a 200 cc. Erlenmeyer flask, shaken intermittently at room temperature for a period of about 2 hours and then filtered to yield a clear deep dark red-amber solution. Ten grams of t-butyl chloride was added to 20 g. of the filtrate (which contained both aluminum and vanadium compounds in solution as shown by emission spectrography) and the resulting solution was allowed to stand for a period of about 16 hours at room temperature attached to a reflux column provided with an overhead soda-lime tower. Hydrogen chloride was evolved. The solution was then heated under reflux (45°–62° C.) and more hydrogen chloride was evolved. During the reflux period of 2 hours the temperature of the flask rose to 82° C. The flask and contents thereof were then allowed to cool to room temperature and the reaction product washed with water, dried and distilled under reduced pressure. A cut boiling at 76–78° C. at 33.5 mm. (175–177° C. at 760 mm.) comprising 4 g. of t-butylbenzene was recovered. Infra-red analysis of the t-butylbenzene fraction indicated a purity of at least 90%. In addition about 0.5 g. of crystalline p-di-t-butylbenzene melting at 80–81° C. was recovered.

*Example II*

To show the advantages of the present process a comparative example was run under the same conditions as set forth in Example I above. A mixture of 5.4 g. of aluminum chloride and 100 g. of benzene, in the absence of any metal oxide, was shaken intermittently for 2 hours in a 200 cc. Erlenmeyer flask and thereafter filtered yielding a pure pale yellow liquid. Ten grams of t-butyl chloride was added to 20 g. of this filtrate and the resulting solution allowed to stand for a period of 16 hours attached to a reflux condenser equipped with an overhead soda-lime tower. At the end of this 16 hour period it was found that no hydrogen chloride had been evolved. The reaction mixture was then heated under reflux for a period of 2 hours, no hydrogen chloride being evolved during this period while the reflux temperature remained at 62° C. with no rise in temperature being evident. The flask and contents thereof were then cooled to room temperature and the product was washed with water, dried and subjected to fractional distillation. The product upon distillation yielded only benzene, no t-butyl benzene or di-t-butylbenzene being evident.

*Example III*

A mixture of 100 g. of benzene, 10 g. of vanadium pentoxide and 5 g. of aluminum chloride were placed in a glass liner of a rotating autoclave of 850 cc. capacity. The autoclave was first flushed with nitrogen, the liner was then sealed in, after which the autoclave was again flushed twice with nitrogen. Ethylene was pressed in to an initial pressure of 50 atmospheres after which the autoclave was rotated, the pressure dropping to 35 atmospheres. Ethylene was again pressed in until a pressure of 50 atmospheres was reached and the autoclave was heated to a temperature of about 250° C. for a period of 5.5 hours. During this time the maximum pressure was 112 atmospheres. At the end of the aforementioned time period the autoclave and contents thereof were cooled to room temperature, the final pressure at room temperature being 39 atmospheres. The reaction product was separated, washed with water, dried and distilled, 10 g. of ethylbenzenes being separated and recovered. There was also obtained 1 g. of solid polyethylene.

*Example IV*

A mixture of 100 g. of benzene, 10 g. of tungstic acid and 5 g. of aluminum chloride were placed in a glass liner of an autoclave. The autoclave was first flushed with nitrogen, the liner was then sealed in, after which the autoclave was again flushed twice with nitrogen. Ethylene was pressed in to an initial pressure of 50 atmospheres. The autoclave was then rotated at room temperature, the pressure dropping to 33 atmospheres after which the autoclave was recharged to 50 atmospheres with ethylene and heated to a temperature of 97° C. The temperature was maintained for a period of 5.7 hours during which time the maximum pressure in the autoclave rose to 60 atmospheres. At the end of the aforementioned time the autoclave and contents thereof were cooled to room temperature, the final pressure at room temperature being 30 atmospheres. The excess pressure was vented and 39 g. of the product was recovered in the liner. In addition there was 102 g. of a deep purple liquid outside of the liner. The two products were combined and subjected to fractional distillation, 66 g. of alkylate comprising ethylbenzenes being recovered.

*Example V*

A mixture of 100 g. of benzene, 10 g. of tungstic acid and 5 g. of zirconium chloride were treated in a manner similar to that set forth in Example IV above. Fifty atmospheres of ethylene was pressed into the autoclave, the autoclave was rotated at room temperature, the pressure dropping to 39 atmospheres. Ethylene was again pressed in until 50 atmospheres had been reached and the autoclave was heated to a temperature of 200° C. for a period of about 5.5 hours. The maximum pressure during the heating period reached 83 atmospheres. At the end of the aforementioned time period the autoclave and contents thereof were cooled to room temperature, the final pressure at room temperature being 31 atmospheres. One hundred twenty-nine grams of a product was recovered in the liner, said product being subjected to fractional distillation with the resultant recovery of 44 g. of alkylate comprising ethylbenzenes.

We claim as our invention:

1. A process for the nuclear alkylation of an alkylatable aromatic compound containing a replaceable hydrogen atom which comprises treating an alkylatable aromatic compound with a mixture of a Friedel-Crafts metal halide and an oxide of a metal selected from the group consisting of groups VB and VIB of the periodic table, thereafter reacting the resultant mixture with an alkylating agent at alkylating conditions, and recovering the resultant alkylated aromatic compound.

2. A process for the nuclear alkylation of an alkylatable aromatic hydrocarbon containing a replaceable hydrogen atom which comprises treating an alkylatable aromatic hydrocarbon with a mixture of aluminum chloride and an oxide of a metal selected from the group consisting of groups VB and VIB of the periodic table, thereafter reacting the resultant mixture with an alkylating agent at alkylating conditions, and recovering the resultant alkylated aromatic hydrocarbon.

3. A process for the nuclear alkylation of an alkylatable aromatic hydrocarbon containing a replaceable hydrogen atom which comprises treating an alkylatable aromatic hydrocarbon with a mixture of aluminum chloride and an oxide of a metal selected from the group consisting of groups VB and VIB of the periodic table, thereafter reacting the resultant mixture with alkyl halide at alkylating conditions, and recovering the resultant alkylated aromatic hydrocarbon.

4. A process for the nuclear alkylation of an alkylatable aromatic hydrocarbon containing a replaceable hydrogen atom which comprises treating an alkylatable aromatic hydrocarbon with a mixture of aluminum chloride and an oxide of a metal selected from the group consisting of groups VB and VIB of the periodic table, thereafter reacting the resultant mixture with an olefin at alkylating conditions, and recovering the resultant alkylated aromatic hydrocarbon.

5. A process for the nuclear alkylation of an alkylatable aromatic hydrocarbon containing a replaceable hydrogen atom which comprises treating an alkylatable aromatic hydrocarbon with a mixture of zirconium chloride and an oxide of a metal selected from the group consisting of groups VB and VIB of the periodic table, thereafter reacting the resultant mixture with an alkylating agent at alkylating conditions, and recovering the resultant alkylated aromatic hydrocarbon.

6. A process for the nuclear alkylation of an alkylatable aromatic hydrocarbon containing a replaceable hydrogen atom which comprises treating an alkylatable aromatic hydrocarbon with a mixture of ferric chloride and an oxide of a metal selected from the group consisting of groups VB and VIB of the periodic table, thereafter reacting the resultant mixture with an alkylating agent at alkylating conditions, and recovering the resultant alkylated aromatic hydrocarbon.

7. A process for the nuclear alkylation of an alkylatable aromatic hydrocarbon containing a replaceable hydrogen atom which comprises treating an alkylatable aromatic hydrocarbon with a mixture of aluminum chloride and vanadium pentoxide, thereafter reacting the resultant mixture with an alkylating agent at alkylating conditions, and recovering the resultant alkylated aromatic hydrocarbon.

8. A process for the nuclear alkylation of an alkylatable aromatic hydrocarbon containing a replaceable hydrogen atom which comprises treating an alkylatable aromatic hydrocarbon with a mixture of aluminum chloride and tungstic acid, thereafter reacting the resultant mixture with an alkylating agent at alkylating conditions, and recovering the resultant alkylated aromatic hydrocarbon.

9. A process for the nuclear alkylation of an alkylatable aromatic hydrocarbon containing a replaceable hydrogen atom which comprises treating an alkylatable aromatic hydrocarbon with a mixture of aluminum chloride and chromium sesquioxide, thereafter reacting the resultant mixture with an alkylating agent at alkylating conditions, and recovering the resultant alkylated aromatic hydrocarbon.

10. A process for the nuclear alkylation of an alkylatable aromatic hydrocarbon containing a replaceable hydrogen atom which comprises treating an alkylatable aromatic hydrocarbon with a mixture of aluminum chloride and titanium dioxide, thereafter reacting the resultant mixture with an alkylating agent at alkylating conditions, and recovering the resultant alkylated aromatic hydrocarbon.

11. A process for the nuclear alkylation of an alkylatable aromatic hydrocarbon containing a replaceable hydrogen atom which comprises treating an alkylatable aromatic hydrocarbon with a mixture of aluminum chloride and molybdenum trioxide, thereafter reacting the resultant mixture with an alkylating agent at alkylating conditions, and recovering the resultant alkylated aromatic hydrocarbon.

12. A process for the nuclear alkylation of benzene which comprises treating benzene with a mixture of aluminum chloride and vanadium pentoxide, thereafter reacting the resultant mixture with an alkylating agent at alkylating conditions, and recovering the resultant alkylated benzene.

13. A process for the nuclear alkylation of toluene which comprises treating toluene with a mixture of aluminum chloride and vanadium pentoxide, thereafter reacting the resultant mixture with an alkylating agent at alkylating conditions, and recovering the resultant alkylated toluene.

14. A process for the nuclear alkylation of benzene which comprises treating benzene with a mixture of aluminum chloride and vanadium pentoxide, thereafter reacting the resultant mixture with an alkyl chloride at a temperature in the range of from about 20° to about 100° C., and recovering the resultant alkylbenzene.

15. A process for the nuclear alkylation of benzene which comprises treating benzene with a mixture of aluminum chloride and tungstic acid, thereafter reacting the resultant mixture with chloroethane at a temperature in the range of from about 20° to about 100° C., and recovering the resultant ethylbenzene.

16. A process for the nuclear alkylation of benzene which comprises treating benzene with a mixture of zirconium chloride and tungstic acid, thereafter reacting the resultant mixture with ethylene at a temperature in the range of from about 200° to about 300° C. and at a pressure in the range of from about 25 to about 75 atmospheres, and recovering the resultant ethylbenzene.

17. A process for the nuclear alkylation of benzene which comprises treating benzene with a mixture of aluminum chloride and vanadium pentoxide, thereafter reacting the resultant mixture with t-butyl bromide at a temperature in the range of from about 20° to about 100° C., and recovering the resultant t-butylbenzene.

References Cited in the file of this patent

UNITED STATES PATENTS

| | | |
|---|---|---|
| 2,384,295 | Gaylor | Sept. 4, 1945 |
| 2,423,045 | Passino et al. | June 24, 1947 |